United States Patent Office 3,235,356
Patented Feb. 15, 1966

3,235,356
METHOD OF CONTROLLING GROWTH OF PLANTS
Robert J. Herschler, Camas, Wash., assignor to Crown-Zellerbach Corporation, San Francisco, Calif., a corporation of Nevada
No Drawing. Filed June 29, 1962, Ser. No. 206,194
8 Claims. (Cl. 71—2.3)

This invention relates to a method of controlling the growth and propagation of plants by applying thereto alkyl dimethyl sulfonium salts and alkylaralkyl dimethyl sulfonium salts.

The general object of the present invention is to provide a new, simple, efficient and commercially feasible method of destroying or inhibiting growth and propagation of plants by applying thereto a composition comprising, as an essential active ingredient, at least one compound from the group of alkyl dimethyl sulfonium salts and alkylaralkyl dimethyl sulfonium salts, such compounds being more efficient than known commercial herbicides, and being effective at low concentrations.

Methods of producing alkyl dimethyl sulfonium salts and alkylaralkyl dimethyl sulfonium salts are well known in the art. One method of preparation of such compounds comprises reacting an alkyl halide with the corresponding sulfide, under well established conditions.

Alkyl dimethyl sulfonium salts and alkylaralkyl dimethyl sulfonium salts suitable in the practice of this invention are represented by the following formulas:

(1)    $[RS^+(CH_3)_2]X^-$ and (2)    $[R-Y-S^+(CH_3)_2]X^-$ wherein R represents an alkyl group containing between 6 and 18 carbon atoms preferably between 10 and 14 carbon atoms; Y represents an aralkyl group; and X represents a halogen, a sulfate, or a nitrate.

Typical compounds applicable to the method of the present invention which are represented by the formulas hereinabove include dodecyl dimethyl sulfonium salts, such as the methosulfate salts, illustrative of the Formula 1; and dodecylbenzyl dimethyl sulfonium salts, such as dodecylbenzyl dimethyl sulfonium chloride, illustrative of the Formula 2.

The compounds of this invention, at economically practical treatment levels, have pronounced physiological action on plant life, such as being excellent foliant and aquatic herbicides. The sulfonium salts mentioned hereinabove are water-soluble and are useful in such important commercial applications as controlling broadleaf weeds in corn and grasses. Such sulfonium salts, in accordance with the method of this invention, may be applied as herbicides by spraying a solution of the compound onto the foliage of plants, dispersing the compound in powder form, or by incorporating into an aqueous medium to be treated a phytotoxic amount thereof, i.e. an effective amount sufficient to control or inhibit growth and propagation of plants therein. The concentration of a compound of this invention when applied in a liquid form may vary over a wide range, thus a concentration as low as about 5 p.p.m. may be sufficient in certain cases, however, a concentration of between 10 and 5000 parts per million is generally satisfactory in controlling aquatic plantlife. An amount of at least 5 pounds per acre, preferably from 5 to 250 pounds of the compound per acre is satisfactory in controlling growth and propagation of land plants.

The following examples illustrate, but in no way limit, the method of the present invention.

*Example 1*

Water solutions of several sulfonium salts were sprayed onto the foliage of certain plants in test plots at a rate of 50 pounds of sulfonium salts per acre of the test plots. Plants represented in the test plots were mixed grasses, velvetleaf, crabgrass, sorrel, plantain, Canadian thistle, Queen Ann's lace and lamb's-quarter. Sulfonium salts employed were dodecylbenzyl dimethyl sulfonium chloride, hexylbenzyl dimethyl sulfonium iodide, octadecylbenzyl dimethyl sulfonium iodide, octadecyl dimthyl sulfonium methosulfate, dodecyl dimethyl sulfonium methosulfate and nitrate, and hexadecyl dimethyl sulfonium methosulfate. After about 4 days, it was found that alkylaralkyl dimethyl sulfonium salts were selective herbicides i.e. they destroyed the broadleaf plants and left the grasses and corn unharmed, while the alkyl sulfonium salts were total herbicides i.e. they destroyed all of the plants.

*Example 2*

Water solutions of dodecyl dimethyl sulfonium methosulfate and iodide were sprayed onto the foliage of mixed narrow and broadleaf plants employed in Example 1 at treatment levels of 17, 34, and 68 pounds per acre. At the treatment level of 17 pounds per acre all broadleaf plants were killed after about 4 days, however, the corn was unharmed. At the higher treatment levels of 34 and 68 pounds per acre all of the plants were killed.

*Example 3*

Dodecylbenzyl dimethyl sulfonium chloride, iodide, and methosulfate were applied as aquatic herbicides to water plants Lemna and Elodea at concentration levels of 50, 25 and 10 p.p.m. After about 4 days, it was found that all of the three compounds were very effective at killing both Lemna and Elodea and the kill was accomplished at all of the concentration levels.

Thus from the foregoing description of this invention it will be apparent that I have discovered a new method of applying alkyl dimethyl sulfonium salts and alkylaralkyl dimethyl sulfonium salts as excelent and highly effective agents for controlling the growth and propagation of plants.

Reasonable variations and modifications are possible within the scope of the foregoing disclosure and appended claims.

Having thus described my invention in preferred embodiments, I claim:

1. A method of controlling growth and propagation of broad-leaved plants which comprises applying to the plants a composition comprising a phytotoxic amount of an alkyl dimethyl sulfonium salt represented by the formula:

$$[RS^+(CH_3)_2]X^-$$

wherein R is alkyl containing between 6 and 18 carbon atoms and X is selected from the group consisting of chloride, bromine, iodine, sulfate, methosulfate, and nitrate.

2. The method of claim 1 wherein R contains between 10 and 14 carbon atoms.

3. The method of claim 1 wherein said alkyl dimethyl sulfonium salt is a dodecyl dimethyl sulfonium salt.

4. The method of claim 1 wherein said alkyl dimethyl sulfonium salt is applied in an effective amount of less than 34 pounds per acre to control growth and propagation of broad-leaved plants.

5. A method of controlling growth and propagation of aquatic plants which comprises applying to the plants a composition comprising a phytotoxic amount of an alkylaralkyl dimethyl sulfonium salt represented by the formula:

$$[R-Y-S^+(CH_3)_2]X^-$$

wherein R is alkyl containing between 6 and 18 carbon atoms; R—Y is alkylbenzyl; and X is selected from the group consisting of chlorine, bromine, iodine, sulfate, methosulfate, and nitrate.

6. The method of claim 5 wherein R contains between 10 and 14 carbon atoms.

7. The method of claim 5 wherein said alkylaralkyl dimethyl sulfonium salt is a dodecylbenzyl dimethyl sulfonium salt.

8. The method of claim 5 wherein said alkylaralykyl dimethyl sulfonium salt is applied in a phytotoxic concentration of between 10 and 5000 parts per million to control growth and propagation of aquatic plants.

References Cited by the Examiner
UNITED STATES PATENTS 2,854,791  10/1958  Antoginini _____ 71—2.5
3,101,265  8/1963  Smutny et al. _____ 71—2.4

LEWIS GOTTS, *Primary Examiner.*